(12) United States Patent
Curry et al.

(10) Patent No.: US 8,657,071 B2
(45) Date of Patent: Feb. 25, 2014

(54) TREE PLATFORM AND SUPPORT

(75) Inventors: Ross Curry, Biwabik, MN (US); Reid Burland, Biwabik, MN (US)

(73) Assignee: Geronimo Construction, Biwabik, MN (US)

( * ) Notice: Subject to any disclaimer, the term of this patent is extended or adjusted under 35 U.S.C. 154(b) by 241 days.

(21) Appl. No.: 13/010,236

(22) Filed: Jan. 20, 2011

(65) Prior Publication Data

US 2012/0186912 A1 Jul. 26, 2012

(51) Int. Cl.
*A01M 31/02* (2006.01)
(52) U.S. Cl.
CPC ..................................... *A01M 31/02* (2013.01)
USPC ........ 182/128; 182/150; 182/187; 248/218.4; 248/219.3
(58) Field of Classification Search
USPC .......................... 182/87, 128, 187; 52/745.21; 248/218.4, 219.3
See application file for complete search history.

(56) References Cited

U.S. PATENT DOCUMENTS

| | | | | |
|---|---|---|---|---|
| 350,289 | A | * | 10/1886 | Brown .......................... 182/136 |
| 488,247 | A | * | 12/1892 | Loebs ............................ 108/151 |
| 784,606 | A | * | 3/1905 | Weightman .................... 182/136 |
| 1,197,999 | A | * | 9/1916 | Beckett .......................... 182/187 |
| 1,370,166 | A | * | 3/1921 | Thiel .............................. 182/187 |
| 1,608,036 | A | * | 11/1926 | Robinson ................... 248/240.3 |
| 1,759,966 | A | * | 5/1930 | Swinney ........................ 182/187 |
| 2,043,128 | A | * | 6/1936 | Sutton ............................ 182/150 |
| 2,066,984 | A | * | 1/1937 | Lamb ............................ 182/113 |
| 2,577,979 | A | * | 12/1951 | Pierson et al. ................ 248/235 |
| 3,198,285 | A | * | 8/1965 | Nerlich .......................... 182/128 |
| 3,561,712 | A | * | 2/1971 | Newsome ...................... 211/107 |
| 4,056,902 | A | * | 11/1977 | Ziegler, Jr. ......................... 52/73 |
| 4,069,891 | A | * | 1/1978 | McClung ...................... 182/187 |
| 4,290,504 | A | * | 9/1981 | Cuba ............................. 182/187 |
| 5,522,186 | A | * | 6/1996 | Jarman ............................. 52/73 |

(Continued)

OTHER PUBLICATIONS

Definition of Trapezoid; Webster's II New Riverside Dictionary, Revised Edition, copyright 1996. p. 716.*

*Primary Examiner* — Alvin Chin Shue
*Assistant Examiner* — Colleen M Chavchavadze
(74) *Attorney, Agent, or Firm* — Mueting Raasch & Gebhardt PA

(57) ABSTRACT

A support assembly for a tree-based platform includes a rod having a length greater than a diameter of a tree to which the platform is intended to be attached. The assembly further includes a first ring defining an opening configured to receive a portion of a tree, and a first plurality of extending members inwardly advanceable relative to the first ring. Each of the extending members has an end portion configured to engage the tree in the opening of the first ring when sufficiently advanced. The assembly further includes a second ring defining an opening configured to receive a portion of the tree, and a second plurality of extending members inwardly advanceable relative to the second ring. Each extending member has an end portion configured to engage the tree in the opening of the second ring when sufficiently advanced. The assembly further includes first and second supports. Each support has a bottom rail, a top rail, and two side rails. The top rails of the first and second support are configured to be coupled to the second ring, and the bottom rails of the first and second supports are configured to be coupled to the first ring. The assembly further includes a first tension element configured to couple to the rod and the bottom rail of the first support, and a second tension element configured to couple to the rod and the bottom rail of the second support.

3 Claims, 15 Drawing Sheets

(56) References Cited

U.S. PATENT DOCUMENTS

| | | | |
|---|---|---|---|
| 6,668,977 B2 * | 12/2003 | Arsenault | 182/187 |
| 6,722,472 B2 * | 4/2004 | Berkbuegler | 182/187 |
| 6,725,972 B1 * | 4/2004 | Krier et al. | 182/187 |
| 7,070,158 B1 * | 7/2006 | Gamble | 249/20 |
| 7,748,195 B2 * | 7/2010 | Keith | 52/745.21 |
| 8,042,652 B2 * | 10/2011 | Weir | 182/116 |
| 8,201,787 B2 * | 6/2012 | Ingram et al. | 248/218.4 |
| 8,272,479 B1 * | 9/2012 | Leach | 182/187 |
| 2005/0269158 A1 * | 12/2005 | Fulton | 182/187 |
| 2009/0095569 A1 * | 4/2009 | Cooper et al. | 182/187 |

* cited by examiner

TREE PLATFORM AND SUPPORT

FIELD

This application relates to, among other things, tree-mounted platforms.

BACKGROUND

Canopy tours, where people are able to move among the canopy of a forest, have grown in popularity over the years and are part of the burgeoning ecotourism industry. Such tours require construction of platforms supported by the trees high above the ground. Accordingly, the platforms must be sturdy and properly installed to ensure safety.

Currently available platforms can be difficult and time consuming to install and often are not easily adjusted to accommodate for growth of the tree. In addition, many available platforms require multiple intrusions into the tree, which can adversely affect the health of the tree.

BRIEF SUMMARY

In various embodiments, the present disclosure describes, among other things, tree-based platforms that are sufficiently robust to ensure safety, are easy to install, are readily adjustable to accommodate tree growth, and provide minimal intrusions into the tree.

In numerous embodiments described herein, a tree-based platform support assembly includes a rod having a length greater than a diameter of the tree to which the platform is intended to be attached. The platform support assembly further includes a first ring defining an opening configured to receive a portion of the tree, and includes a first plurality of extending members inwardly advanceable relative to the first ring. Each of the extending members is configured to engage the tree in the opening of the first ring when sufficiently advanced. In addition, the platform support assembly includes a second ring defining an opening configured to receive a portion of the tree, and includes a second plurality of extending members inwardly advanceable relative to the second ring. Each of the extending members is configured to engage the tree in the opening of the second ring when sufficiently advanced. The platform support assembly further includes first and second supports. Each of the supports has a bottom rail, a top rail, and side rails. The top rails of the first and second support are configured to be coupled to the second ring, and the bottom rails of the first and second supports are configured to be coupled to the first ring. The platform support assembly also includes a first tension element configured to couple to the rod and the bottom rail of the first support, and includes a second tension element configured to couple to the rod and the bottom rail of the second support.

In some embodiments described herein, a method includes (i) inserting a rod through a trunk of a tree such that first and second end portions of the rod extend from the tree; (ii) coupling a first tension member to the first end portion of the rod; (iii) coupling a second tension member to the second end portion of the rod; (iv) coupling the first tension member to a first support of a support assembly for a tree-based platform; and (v) coupling a second tension member to a second support of the support assembly for the tree-based platform. The method may further include placing a ring about the tree at a position below the rod, and coupling the ring to the first and second supports. The radial position of the first ring relative to the tree may be fixed by advancing extending members inwardly relative to the first ring until the extending members engage the tree.

In various embodiments described herein, a tree-based platform support assembly includes a rod having a length greater than a diameter of a tree to which the platform is intended to be attached. The platform assembly further includes first and second supports, each of which has a beam configured to support flooring of the platform. In addition, the platform assembly includes a first tension member configured to couple to the rod and the first support to suspend the first support from the rod, and includes a second tension member configured to couple to the rod and the second support to suspend the second support from the rod.

In numerous embodiments described herein, a tree-based platform support assembly includes a ring defining an opening having a diameter greater than a portion of a trunk of a tree. The platform support assembly further includes a plurality extending members inwardly advanceable relative to the ring. Each of the extending members is configured to engage the trunk of the tree in the opening of the ring when sufficiently advanced. The platform support assembly also includes first and second supports configured to be coupled to the first ring. Each of the supports has a beam configured to support flooring of the platform.

Various embodiments of the apparatuses, assemblies and methods described herein may have one or more advantages relative to existing tree-based platform support assemblies. For example, embodiments employing a rod, such as an all thread bolt, that extends through the tree provides for more reliable and predictable support than lag bolts that are used with many current systems. That is, the through rods can be engineered to support specific amounts of weight, while lag bolts rely on the structural integrity of the tree (which may be unknown) for support. By way of additional example and in many embodiments described herein, the only intrusions into a tree are made by the rod extending through the tree. Thus, only two intrusions into the tree are made (one on each side), as opposed to many more intrusions with existing systems and assemblies. In many embodiments described herein, the support assemblies for tree-based platforms may be installed in a few hours (e.g., about 6 man hours) as opposed to the lengthy installation times of currently available support assemblies (e.g., 24 man hours). In some embodiments, the support assemblies described herein may be installed on nearly any tree (i.e, they are not tree-specific), whereas many currently available support assemblies are designed specifically for the tree to which they are to be attached. The advantages will be readily understood from the following detailed descriptions when read in conjunction with the accompanying drawings.

Figure 1A:
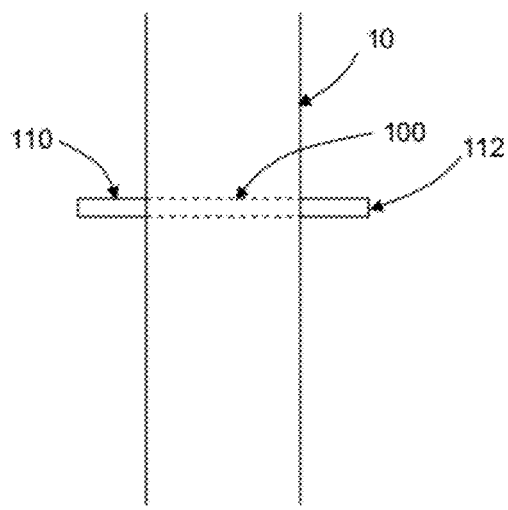
FIGS. 1A-E are schematic side views of various components of a support assembly, and show an embodiment of a process for assembling the supports in a tree.
Figure 2A:
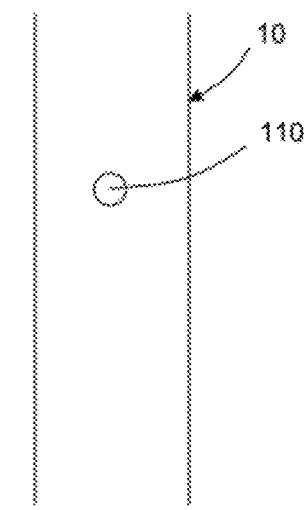
FIGS. 2A-E are schematic front views generally corresponding to the views shown in FIGS. 1A-E, respectively.

The drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope of spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like. For example, a support assembly for a tree-based platform comprising a rod, a tension member, and a support may consist of, or consist essentially of, the rod, the tension member and the support.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

In various embodiments, the present disclosure describes, among other things, tree-based platforms that are sufficiently robust to ensure safety, are easy to install, are readily adjustable to accommodate tree growth, or provide minimal intrusions into the tree.

Referring now to FIGS. 1-2, schematic diagrams of installation of components of an embodiment of a support assembly for a tree-based platform are shown. FIGS. 1A-E show side views, and FIGS. 2A-E show corresponding front views. As shown in FIGS. 1A and 2A, a rod 100 is inserted through a tree 10. The rod 100 has a length greater than the diameter of the portion of the tree 10 through which it is inserted. The rod has first 110 and second 112 end portions that are configured to extend radially from the tree 10 when the rod is inserted through the tree.

Preferably, the rod 100 extends from either end of the tree a distance sufficient to allow for three or more years of tree growth without overgrowing the ends 110, 112 of the rod. More preferably, the rod 100 is sufficiently long to allow for five or more, or ten or more, years of tree growth. It will be understood that the growth of a tree will depend on the type of tree and the growing conditions. Typically a tree will grow between about 0.25 inches and about 2 inches in diameter per year. Accordingly, to accommodate at least three years of growth, the rod 100 should be between about 0.75 inches and about 6 inches longer than the initial diameter of the tree (at the time of initial installation of the platform support). To accommodate five years of growth, the rod 100 should be at least between about 1.25 inches and about 10 inches greater than the initial diameter of the tree. To accommodate ten years of growth, the rod should be at least between about 2.5 inches and about 20 inches greater than the initial diameter of the tree. Of course, the rod may be 30 inches or more or 40 inches or more longer than the initial diameter of the tree, which may effectively allow the rod to be used for the life of the tree. This will limit the number of times intrusions into the tree will be made, which should result in improved tree health relative to existing platform support structures.

Any suitable rod 100 may be used. In some embodiments, the rod is a threaded rod, such as an all-thread bolt.

It will be understood and appreciated that a rod 100 that extends through a tree 10 may provide reliable and predicable support for a platform. For example, the rod can be engineered to specific standards (e.g., materials and diameter) to reliably support a given amount of weight, unlike lag bolts which are used in many current tree-based platforms and which depend on the integrity of the tree into which they are screwed for support.

Figure 1B:
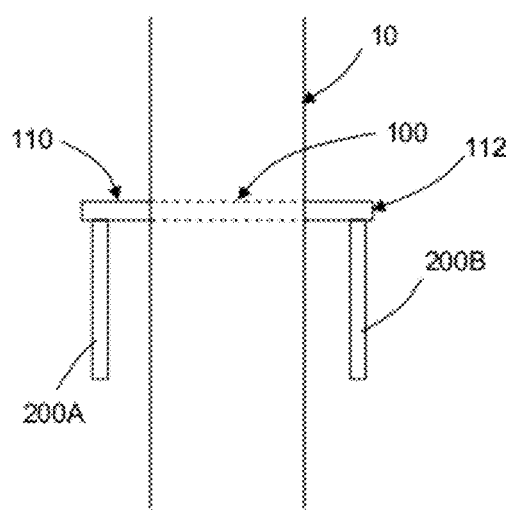
Figure 2B:
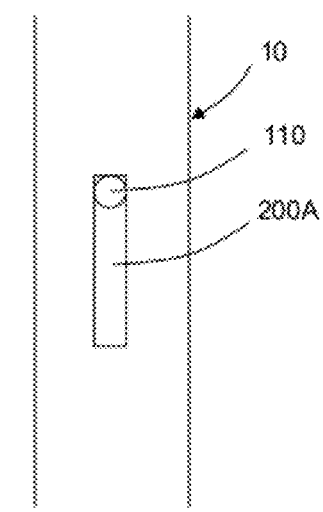

Referring now to FIGS. 1B and 2B, a first tension member 200A is coupled to the first end portion 110 of the rod 100, and a second tension member 200B is coupled to the second end portion 112 of the rod 100. Any suitable tension member, such as a turnbuckle, may be employed. Other suitable tension members that may be employed include those having motorized actuators or hydraulic mechanisms for providing suitable tension. In general, the tension members 200A, 200B can be adjusted to suspend a support at a desired height or level.

Figure 1C:
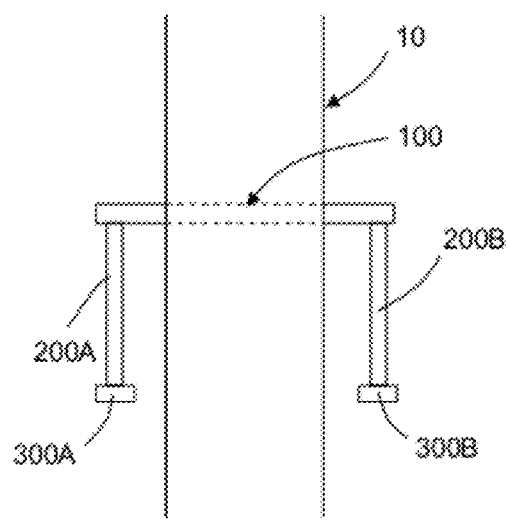
Figure 2C:
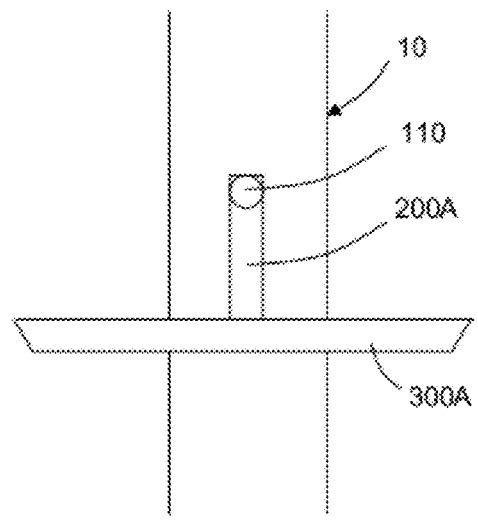
Figure 2D:
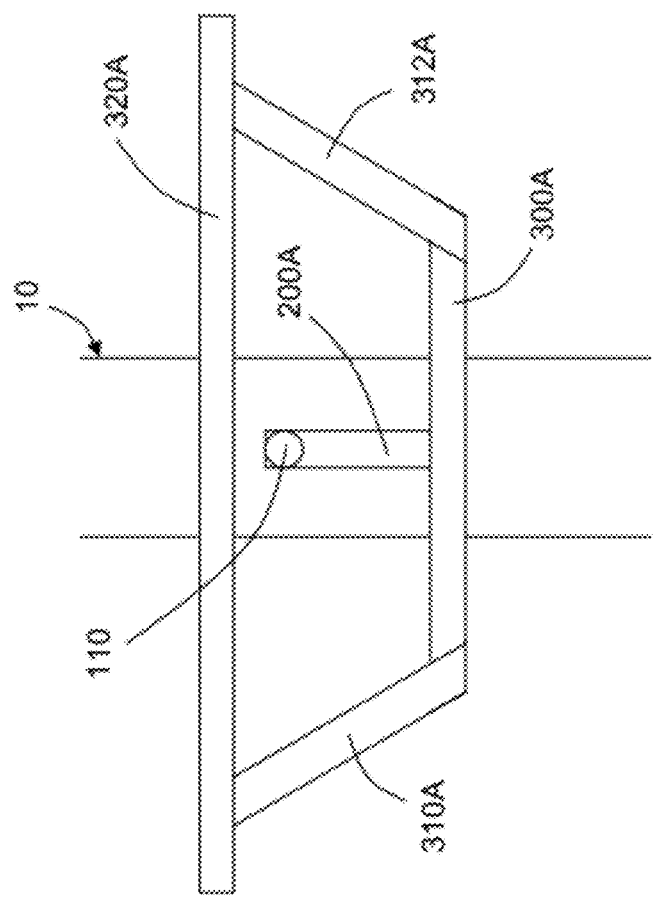
Figure 1D:
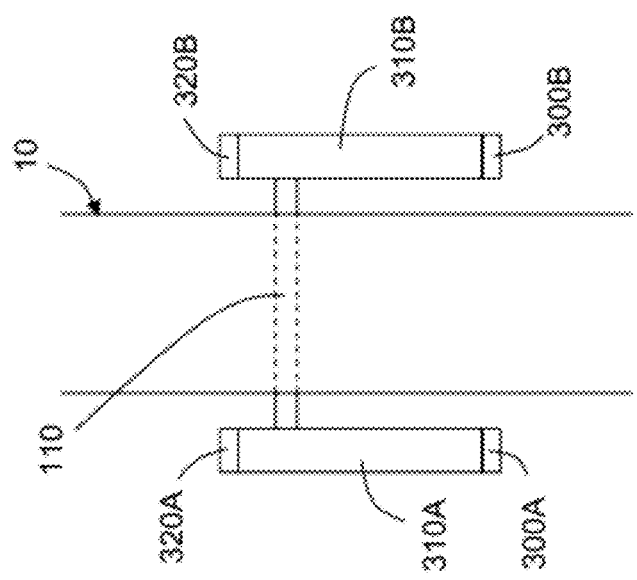

As shown in FIGS. 1C and 2C, the tension members 200A, 200B are coupled to a portion of a support. In the depicted embodiment, the portion of the support is a bottom rail 300A, 300B of a support assembly. The remainder of the support may then be assembled. For example and with reference to FIGS. 1D and 2D, side rails 310A/B, 312A for each support assembly are coupled to the bottom rail 300A/B, and a top rail 320A/B is attached to the side rails 310, 312 for each support. The rails may be coupled to each other through any suitable mechanism, such as bolts, clamps, welds or the like. Of course, the support assembly may be a unitary structure rather than a multi-part assembly as shown. However, a unitary support structure may be more difficult to lift into the tree and attach to the tension member 200. In addition, a unitary support structure may be difficult to position around limbs of a tree, necessitating cutting of limbs. In many cases, multi-part support structures, such as those depicted in FIGS. 1C, 1D, 2C, and 2D may be assembled around intact limbs. In addition, multi-part support assemblies may allow for easier shipping and handling relative to larger and heavier unitary support structures.

Figure 3:
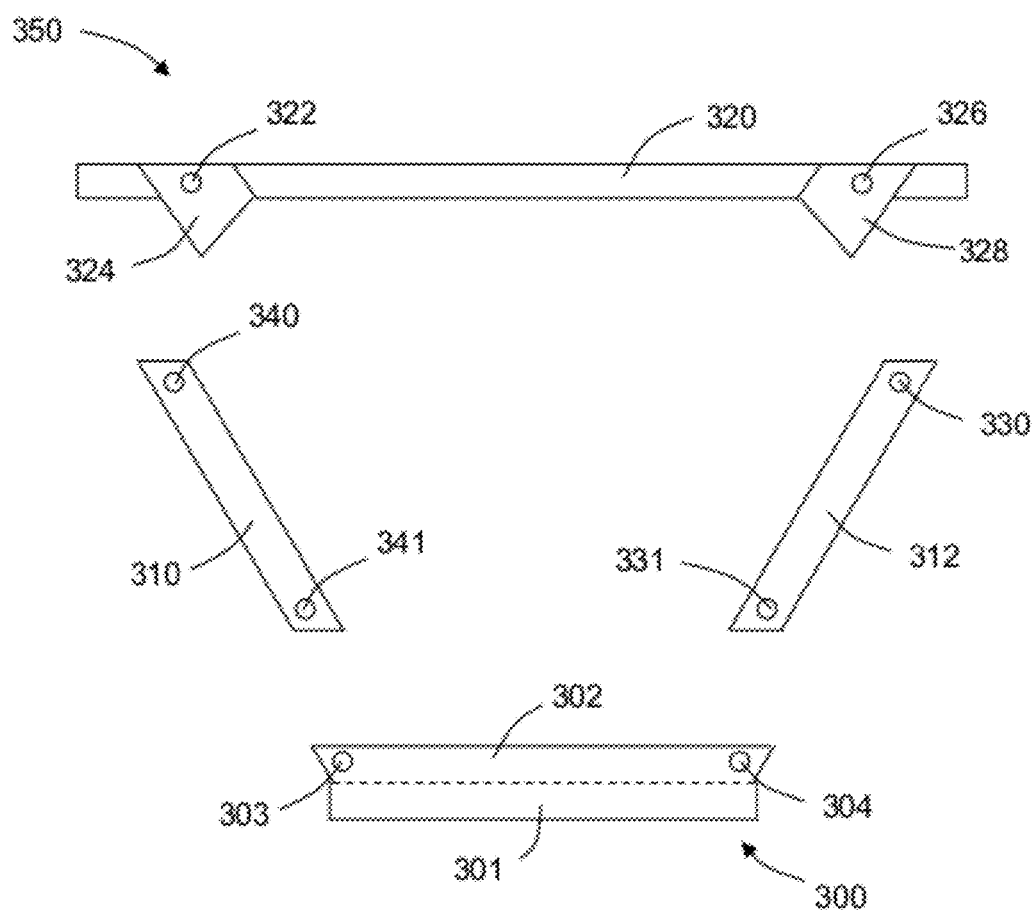
FIGS. 3-4 are schematic side views of an embodiment of a support assembly, showing some components of the assembly.
Figure 4:
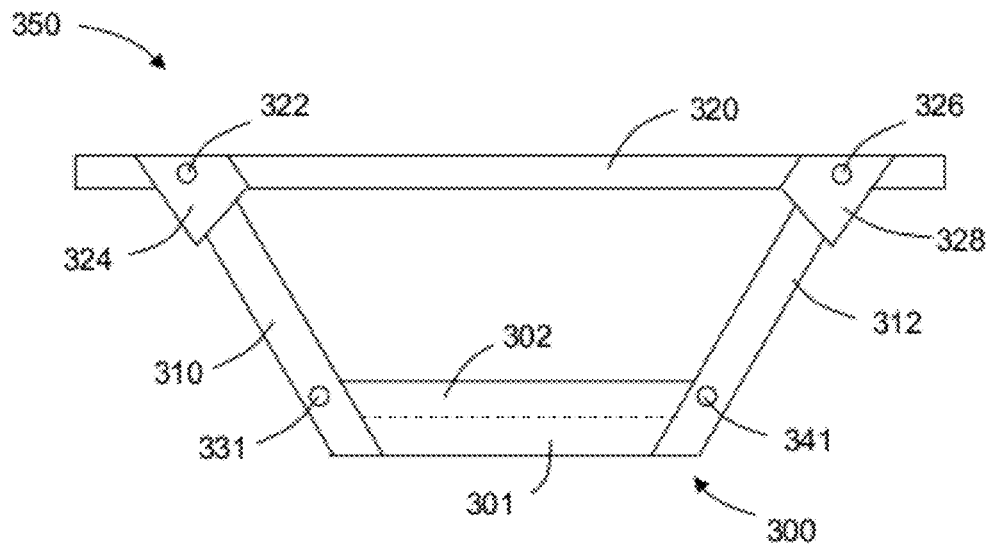

An example of a multi-part support assembly 350 is shown in FIGS. 3-4. FIG. 3 is a schematic side view of a disassembled support 350, and FIG. 4 is a schematic side view of a partially assembled support 350. In the depicted embodiment, the support 350 has a top rail 320, a bottom rail 300, and side rails 310, 312. The rails have holes or openings that are configured to be aligned during final assembly of the support 350. For example, hole 341 of side rail 310 is configured to be aligned with hole 303 of bottom rail 300 when the support is assembled. Similarly, holes 340 and 322, 326 and 330, 331 and 304 are configured to be aligned when the support is assembled. Accordingly, a bolt or other fastening rod may be inserted through the aligned holes so that the rails may be secured together. Each rail is depicted as having two holes; however, it will be understood that the rails may have any suitable number of holes or openings. It will also be understood that bolts or fastening rods are only one way that the rails may be fastened or secured relative to one another. For example, clamps, welds, or the like may be used to fasten or secure the rails to assemble the support 350.

In the embodiment depicted in FIGS. 3-4, the top rail 320 includes brackets 324, 328 configured to receive a portion of side rails 310, 312. The brackets 324, 328 assist in assembly and securing of the support 350. The bottom rail 320 includes a base member 301 and a flange 302 (delineation marked by dashed line). The flange 302 extends from the base member 310 at an angle (e.g., about 90 degrees) suitable for the bottom of the side rails 310, 312 to contact the base 301 of the bottom rail 300 and for the back of the side rails 310, 312 to contact the flange 302.

It will be understood that any suitable multi-part support assembly may be used and that FIGS. 3-4 depict only one embodiment envisioned herein. Any support, whether multi-part or unitary may be used. Most supports will include a top rail, a bottom rail, and two side rails.

The supports, or rails thereof, may be made from any suitable material. In many embodiments, the support or rails are made from steel, aluminum, titanium, or the like. The thickness and strength of the support should be sufficient to support the weight of the flooring of the platform and any other support beams (see, e.g., FIGS. 17-18) as well as the desired number of people. When bolts are used, the hardware should also be of sufficient gauge and strength to support the appropriate weight. In many embodiments, the bolts are 0.625 inches in diameter.

In the embodiments depicted herein, the supports are trapezoid shaped (e.g., an isosceles trapezoid). However, it will be understood that the supports may be of any suitable shape.

The rails of the support may be of any suitable length. For example, in one embodiment, the top rail has a length of 13 feet, the bottom rail has a length of 4 feet, and the side rails have a length of five feet, eight inches (68 inches).

Figure 2E:
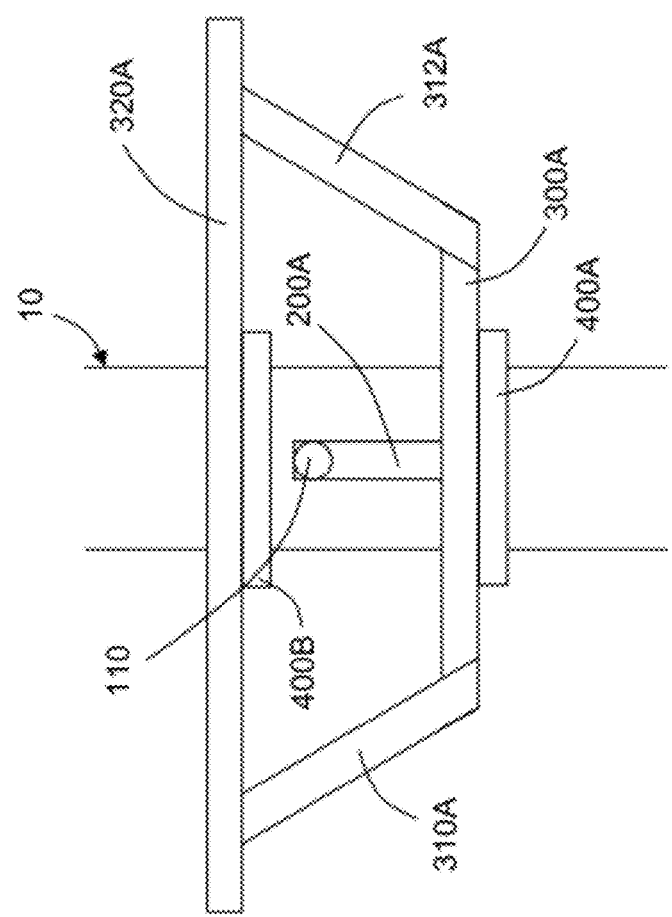
Figure 1E:
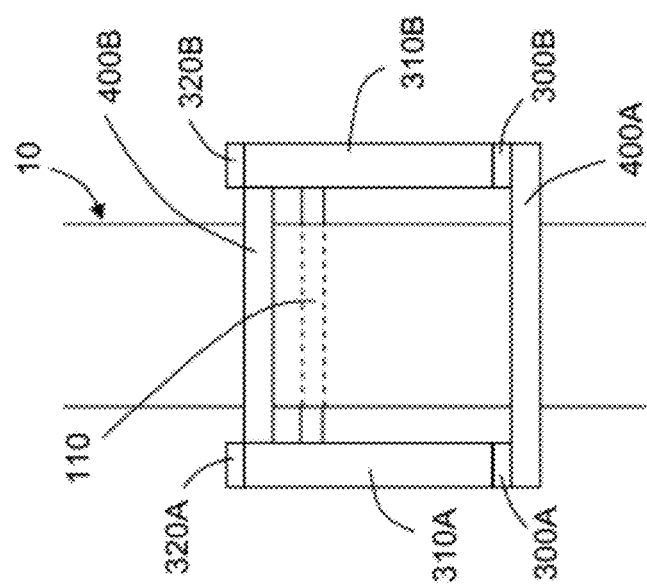

Referring now to FIGS. 1E and 2E, first 400A and second 400B rings are shown disposed about the tree 10. The first ring 400A is coupled to bottom rails 300A, 300B, and the second ring 400B is coupled to top rails 320A, 320B. The rings 400A, 400B serve to maintain the top 320A, 320B and bottom rails 300A, 300B at a fixed radial distance from the tree.

Figure 5:
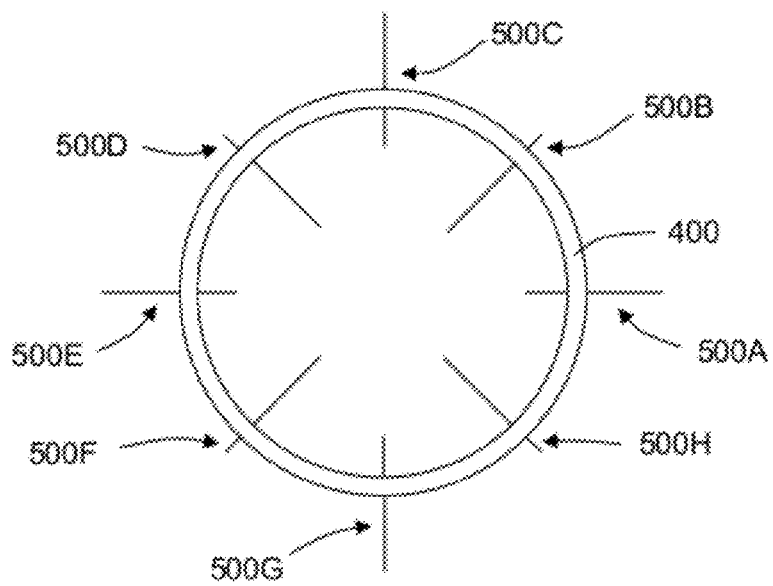
FIG. 5 is a schematic top view of an embodiment of a ring and extensions elements of a support assembly.

As shown in FIG. 5, extension members 500A-H may be operably coupled to a ring 400 and may be advanced radially inwardly relative to the ring 400 until they contact the tree and retain the radial position of the ring 400 relative to the tree. Any suitable number of extension elements 500A-H may be employed. In many embodiments, the extension members 500A-H are threaded bolts that may be advanced or withdrawn through a hole (not shown in FIG. 5) in the ring 400. Of course, extension members may be advanced or withdrawn in any suitable manner and may be constructed in accordance with the mechanism for advancement or withdrawal. For example, the extension members 500A-H may be rods and the mechanism for extension may be hydraulic.

In any case, the extension members 500A-H may be adjusted (typically withdrawn) as the tree grows. In the embodiment depicted in FIG. 5, every other extension member 500B, 500D, 500F, 500H is advanced to a point where it contacts the tree. At times when maintenance adjustments are made, the less advanced extension members 500A, 500C, 500E, 500G may be advanced until they contact the tree, and the others 500B, 500D, 500F, 500H may be withdrawn. In this manner, extensive erosion of the tree by the extension members or tree growth into the extension members can be avoided by avoiding a constant point of contact with the tree over many years.

While eight extension members 500A-H are shown in FIG. 5, it will be understood that any number of extension members may be employed. In some embodiments, six extension members are used.

Depending on the inner diameter of the ring 400, adjustments may be made to extension members 500A-H to allow the rings 400 and supports to remain attached to the tree for many years. For example, the inner diameter of the ring 400 may be between about 1 inches and about 3 inches greater than the diameter of the tree in the position that the ring is attached to the tree to accommodate for one year's growth. For a ring to accommodate five year's growth, the inner diameter of the ring should be about 5 inches to about 10 inches greater than the diameter of the tree. For a ring to accommodate ten year's growth, the inner diameter of the ring should be about 12 inches to about 24 inches greater than the diameter of the tree. Of course, a ring may have any suitable diameter and may be replaced as needed if tree growth encroaches on the inner surface of the ring to prevent undesired intrusion of the ring on the tree.

Figure 6:
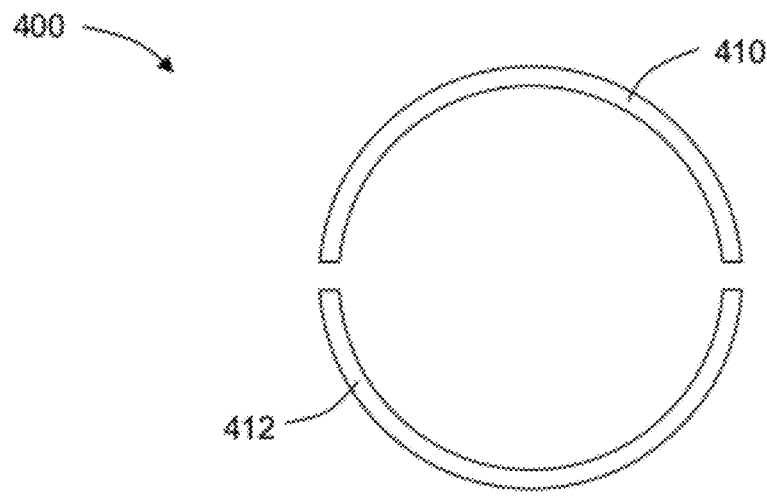
FIG. 6 is a schematic top view of an embodiment of a two part ring of a support assembly.

To get a ring around a tree, the ring may be in multiple parts that are assembled in place around the tree. For example and with reference to FIG. 6, a two-piece ring 400 is shown. The ring has a first piece 410 and a second piece 412 that may be secured together around a tree.

Figure 7:
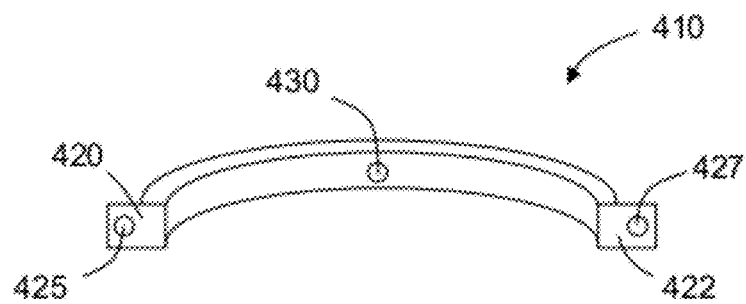
FIGS. 7-8 are schematic perspective views of embodiments of parts of rings.

Referring now to FIG. 7, one part 410 of an embodiment of a multi-part ring is shown. The part 410 in the depicted embodiment is a semicircular ring having two face plates 420, 422 or flanges that extend radially outwardly from the body of the semicircular ring. The plates 422, 424 have holes 425, 427 through which a bolt may be inserted in the process of securing the part 410 of the ring to another part of the ring that also has similar face plates. Also shown in the depicted embodiment is a hole 430 through which an extension member (e.g. 500A of FIG. 5) may be inserted.

Figure 8:
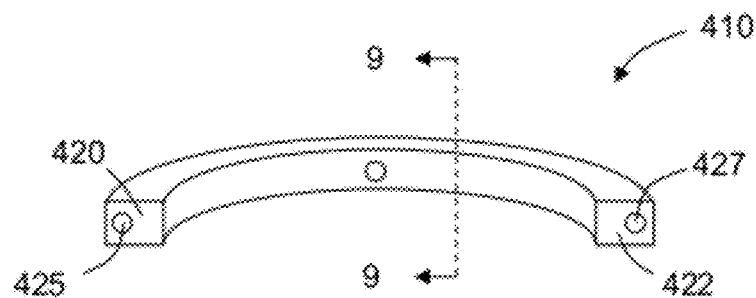
Figure 9:
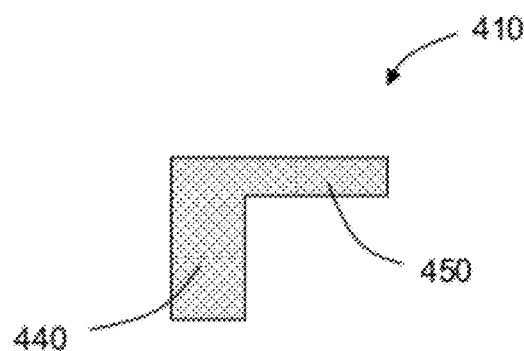
FIG. 9 is a schematic cross-sectional view of the part of the ring depicted in FIG. 8, taken through line 9-9.

As shown in FIGS. 8-9 (FIG. 9 is a cross section taken through line 9-9 of FIG. 8), the part 410 of the ring may also have a top flange portion 450 that extends about 90 degrees from the base 440 of the part 410 of the ring. The flange 450 may provide a surface relative to which the top or bottom rail of a support assembly may be secured.

A ring (or part thereof) as described herein, may be made from any suitable material. For example, a ring (or part thereof) may be formed from steel, aluminum, titanium, or the like.

Figure 10:
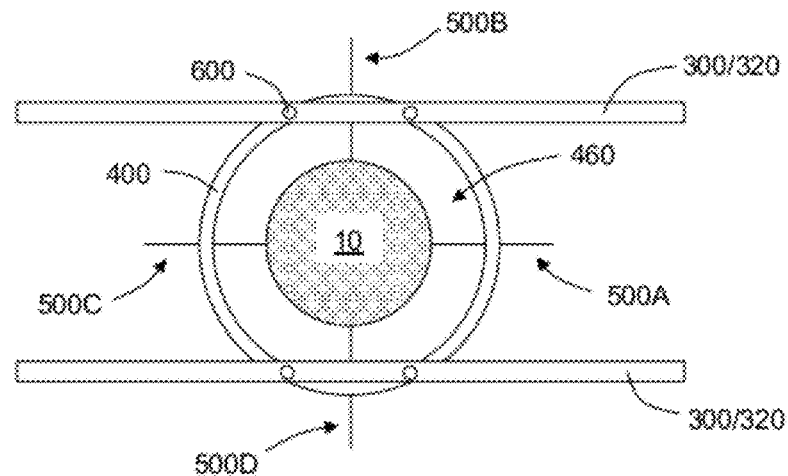
FIG. 10 is a schematic top view of an embodiment of a ring and rails of a support assembly secured relative to a tree.

Referring now to FIG. 10, a schematic top-down view of a ring 400 disposed about a tree 10 is shown. As shown, the tree 10 is received in the opening 460 of the ring 400, and extension members 500A-D are extended radially inwardly relative to the ring 400 to maintain the position of the ring 400 relative to the tree 10. Also shown are rails 300/320 attached to the ring 400 via bolts 600, welds, clamps or the like. The ring 400 and associated extension members 500A-D serve to maintain the radial position of the rails 300/320 relative to the tree.

Figure 11:
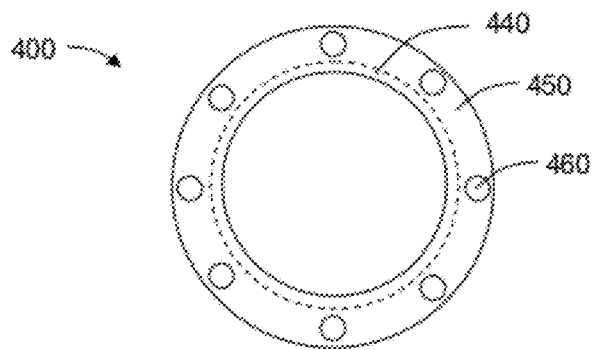
FIG. 11 is a schematic top view of an embodiment of a ring of a support assembly.
Figure 12:
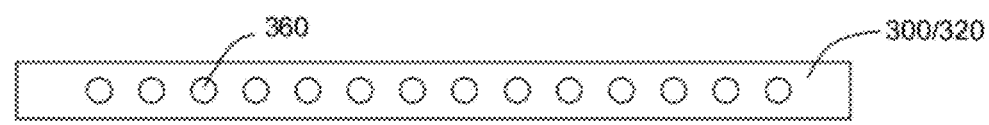
FIG. 12 is a schematic top view of an embodiment of a rail of a support assembly.

Referring now to FIGS. 11-12, schematic top views of an embodiment of a ring 400 and a bottom or top rail 300/320 are shown. The ring 400 includes a body member 440 and a flange 450 that extends radially outwardly from the body 440. The flange has a plurality of holes 460 through which a bolt may be inserted. The rail 300/320 includes a plurality of holes 360 through which a bolt may be inserted. The holes 460 of the ring 400 and the holes 360 of the rail 300/320 may be aligned, and a bolt may be inserted through the aligned holes as part of the process of securing the rail 300/320 to the ring 400.

The plurality of holes 360 in the rail 330/320 allow for adjustment of the positions of the top or bottom rail to accommodate for tree lean while maintaining the proper position and leveling of the rails 300/320. Thus, if the tree is substantially vertical at the location of the rail 300/320, one set of holes 360 may be used in securing the rail 300/320 to the ring 400 (e.g., in conjunction with holes 460 in the ring), and if the tree leans at the location of the rail 300/320, another set of holes 360 may be used in securing the rail 300/320 to the ring 400.

Figure 13:
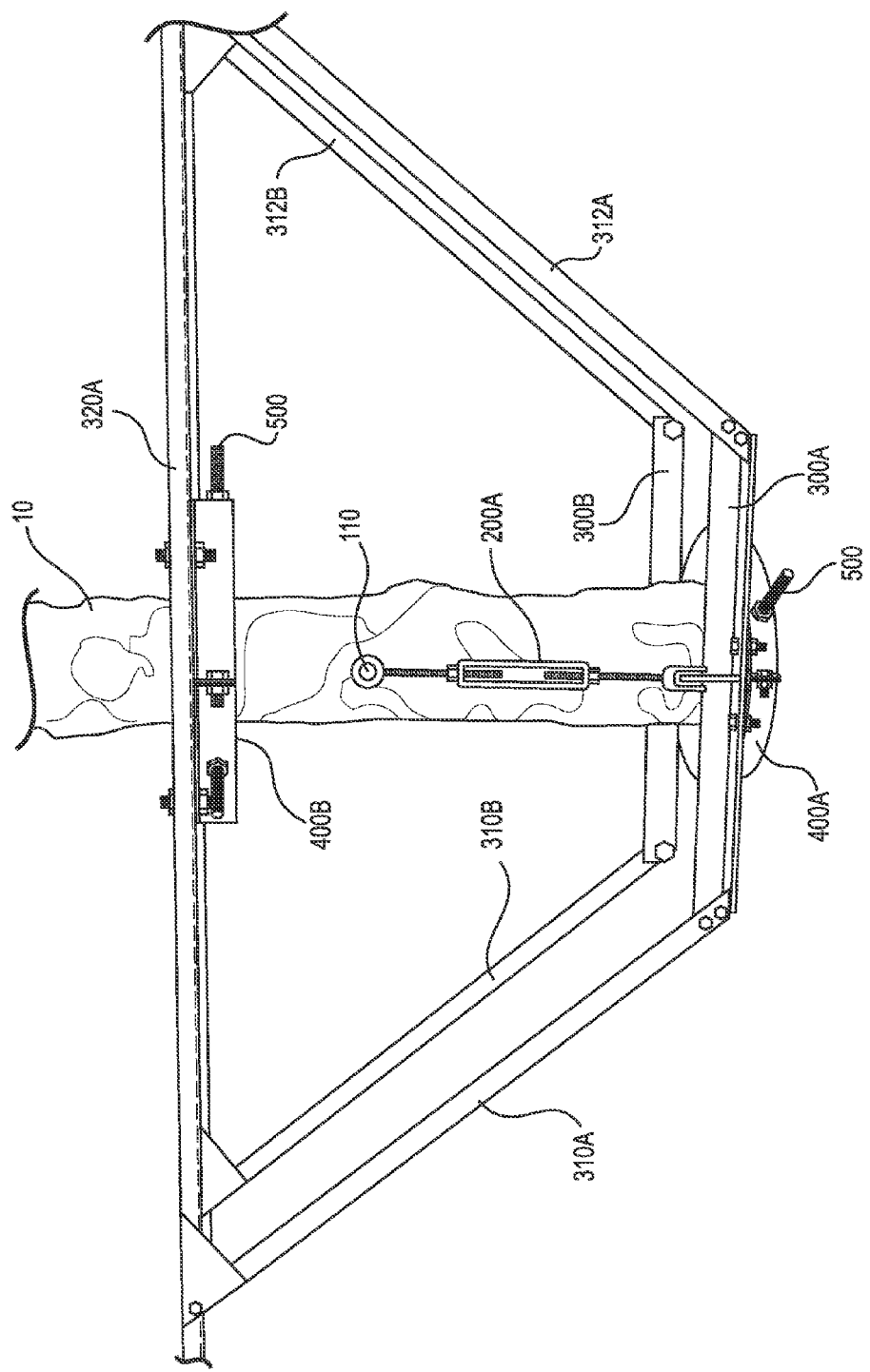
FIGS. 13-15 are schematic line drawings of components of a support assembly that has been attached to a tree.
Figure 14:
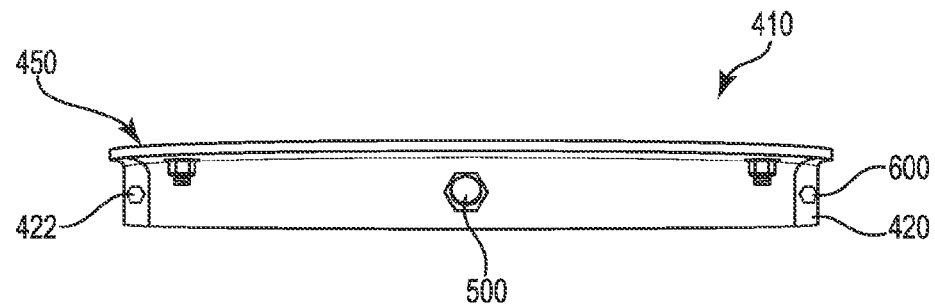
Figure 15:
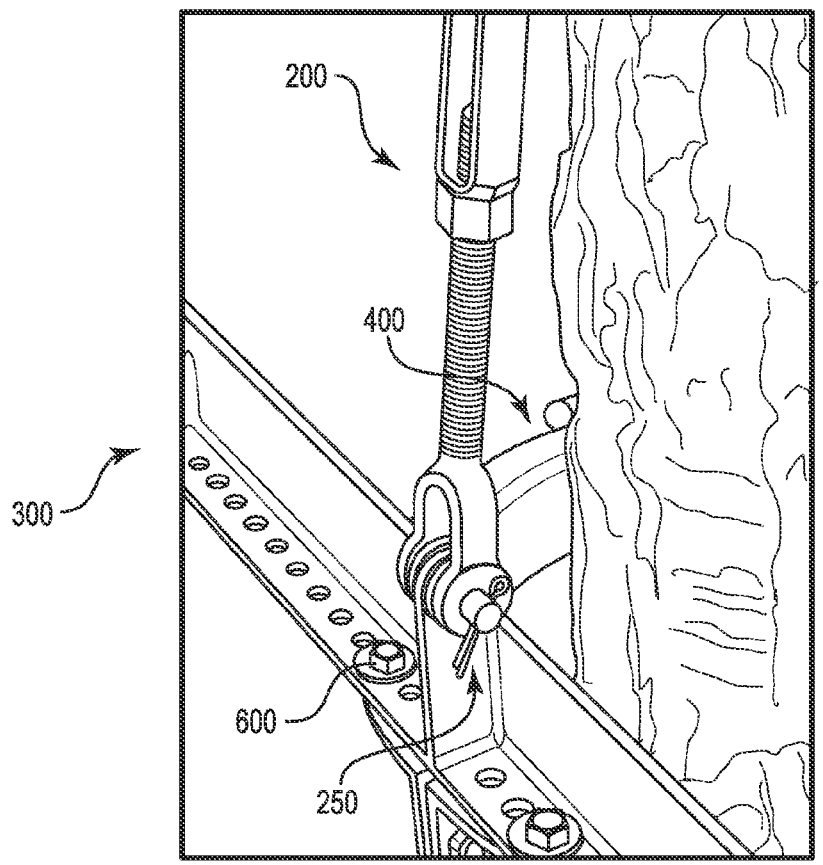

Referring now to FIGS. 13-15, schematic line drawings of a platform support assembly installed in a tree 10 are shown. Some salient features and details of the depicted embodiment will be discussed in more detail below. Referring to FIG. 13, a schematic line drawing of most of a fully-assembled tree-platform support structure is shown. Second 400A and first 400B rings are disposed about the tree 10, with extension members (threaded rods) 500 extended inwardly to engage the tree 10 and retain the radial position of the rings 400A, 400B relative to the tree 10. A rod (all thread) is inserted through the tree such that a first end portion 110 and a second end potion (not shown, blocked by tree) of the rod extend from the tree 10. A first tension element 200A (turnbuckle) is coupled to the first end potion 110 of the rod and to the bottom rail 300A of a support assembly. A second tension element (not shown, blocked by tree) is coupled to the second end of the rod and to the bottom rail 300B of a second support assembly. The first 300A and second 300B bottom rails are also attached to the ring 400A on generally opposing sides of the tree 10. First 320A and second top rails are attached to ring 400B on generally opposing sides of the tree 10. Side rails 310A, 310B, 312A, 312B are attached to the respective bottom and top rails of the support assemblies. The depicted platform support assembly is capable of supporting flooring or beams for the platform.

As can be further seen from FIG. 13, a nut (not labeled) may be disposed about the through rod and adjusted relative to first end portion 110 (and second end portion—not shown) to accommodate for tree growth. Accordingly, tree growth against the nut or tension element 200A (turnbuckle) may be avoided, improving tree health and adjustability of the support assembly.

FIG. 14 is a schematic line drawing of a part 410 of a ring. The part 410 is semicircular and forms half of the ring. The part 410, as well as the remaining part has face plates 420, 422 that extend radially outwardly from the body. The plates 420, 422 have holes through which bolts 600 are inserted for securing the two parts of the ring together. The ring has a top flange 450 that extends radially outwardly from the body of the ring and provides a surface to which top or bottom rails may be secured.

FIG. 15 shows a close up view of a bottom portion of the turnbuckle 200 attached to the bottom rail 300, which is secured to the ring 400. The bottom rail 300 has a plurality of holes, two of which are aligned with holes in the ring 400. Bolts 600 are inserted through the aligned holes and used to secure the bottom rail 300 to the ring 400. The bottom rail 300 also has a protrusion having a hole through which a cotter pin 250 is inserted to secure the turnbuckle 200 to the bottom rail 300. Of course, any other suitable mechanism for securing the turnbuckle to the bottom rail may be used.

Figure 16:
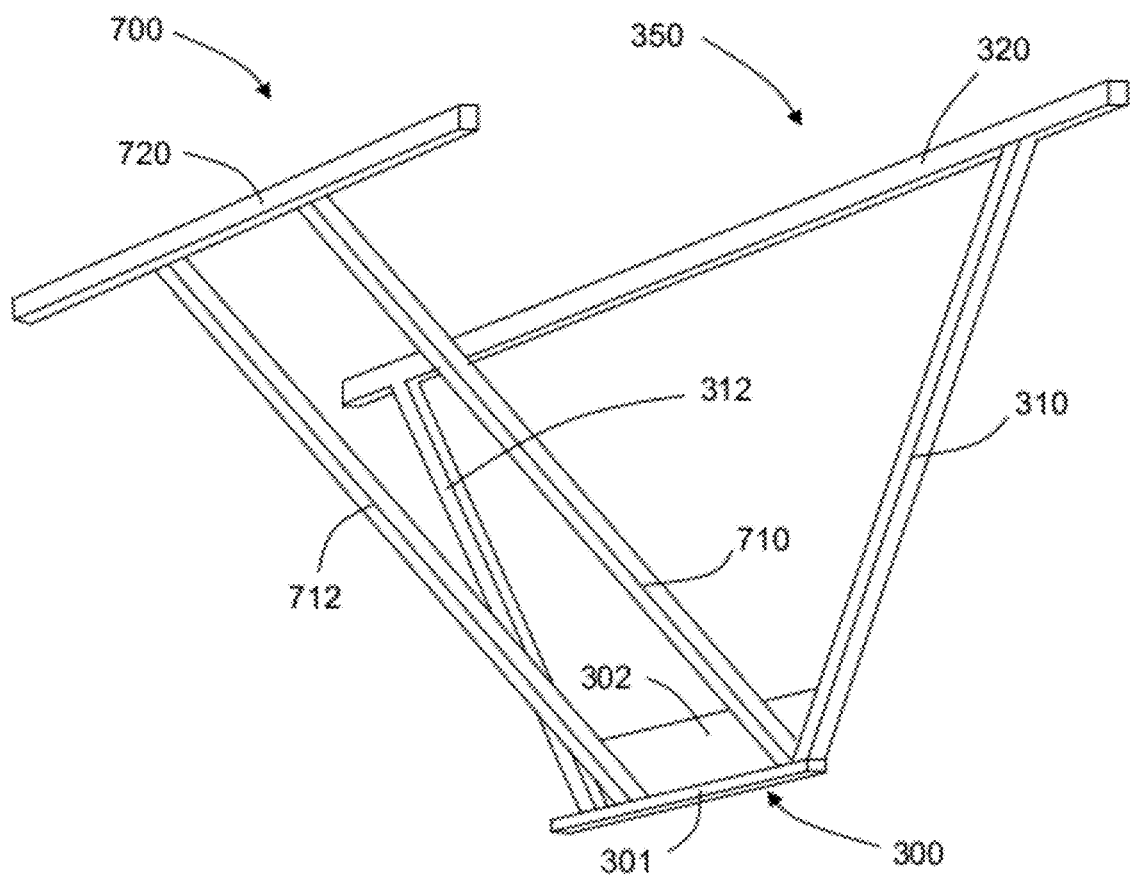
FIG. 16 is a schematic perspective view of a support assembly and an extension.

Referring now to FIG. 16, a perspective view of a support assembly 350 and an extension 700 are shown. The support assembly 350 is generally as described above. That is, the support assembly 350 includes a bottom rail 300, a top rail 320 and side rails 310, 312. The top rail serves as a beam for additional beams or for flooring of a tree-based platform. However, to achieve a broader base onto which the flooring may be placed, an extension 700 may be secured to the support assembly 350. Any suitable extension 700 may be employed.

In the depicted embodiment, the extension 700 includes a top rail 720 and side rails 710, 712. The top rail 720 serves as a beam for additional beams or for flooring of the tree-based platform. The side rails 710, 712 may be attached or secured to the side rails 310, 312 or the bottom rail 300 of the support assembly 350. In the depicted embodiment, the outer edges of the side rails 710,712 of the extension 700 are configured to engage the inner edges of the side rails 310, 312 of the support 350. The bottoms of the side rails 710,712 of the extension 700 are configured to engage the top of the base 301 of the bottom rail 300. The flange 301 of the bottom rail also engages the side rails 710, 712 of the extension 700 and facilitates proper placement of the extension 700 relative to the support 350.

Figure 17:
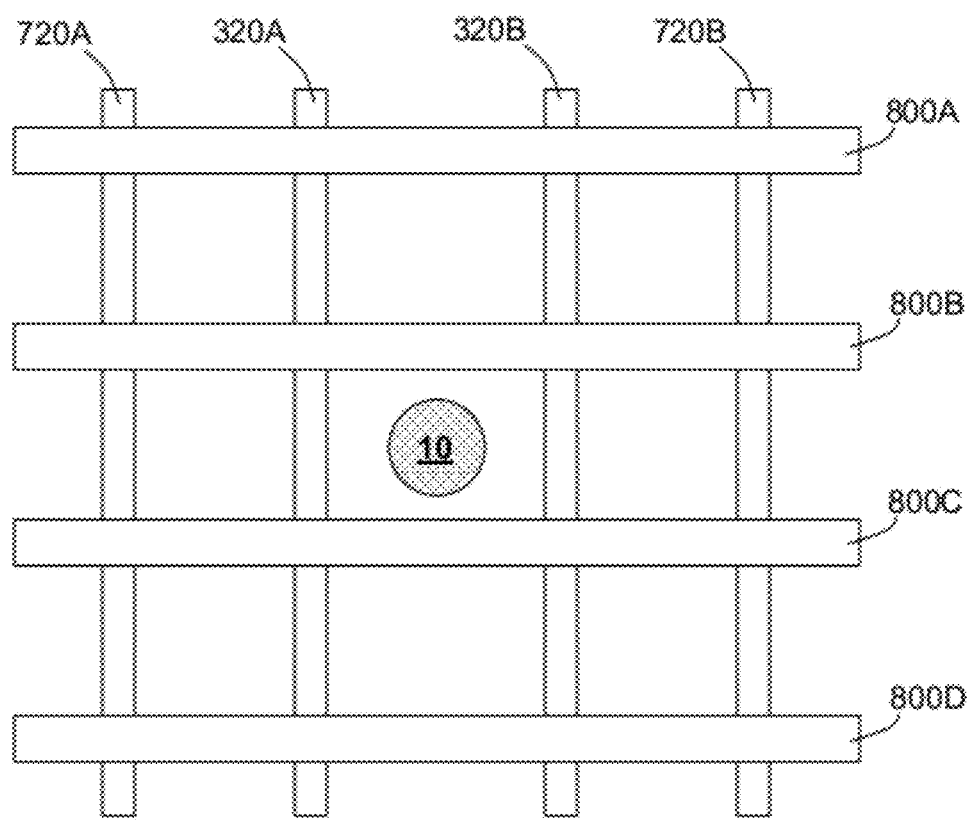
FIG. 17 is a schematic top view of top rails of a support assembly and beams disposed about a tree.
Figure 18:
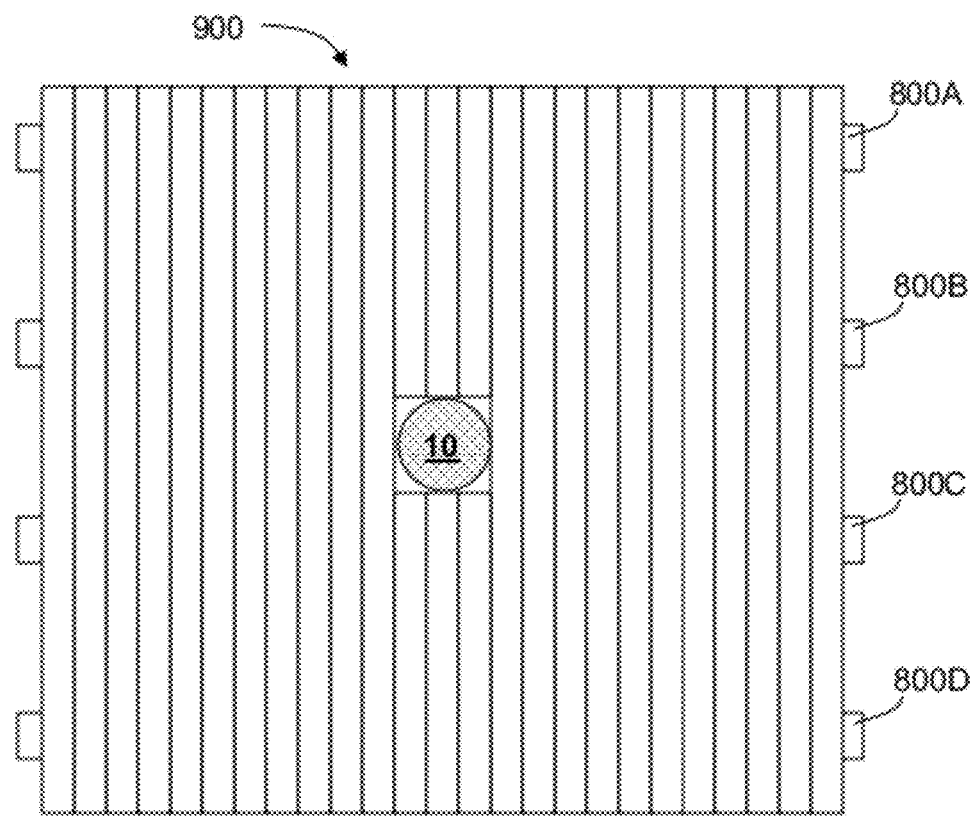
FIG. 18 is a schematic top view of support assembly and beams shown in FIG. 17 with flooring disposed on the beams.

Referring now to FIGS. 17-18, schematic top views of portions of supports and associated extensions secured relative to a tree 10 are shown. As shown in FIG. 17, first 320A and second 320B top rails of first and second supports are secured on generally opposing sides of the tree 10. A first extension having a top rail 720A is coupled to the first support, and a second extension having a top rail 720B is coupled to the second support. The extensions provide a broader base for flooring 900 (see FIG. 18) of the platform. The flooring 900 may be placed on and secured relative to the top rails 320A, 720A, 320B, 720B. Alternatively, beams 800A-D, such as 4'×4' treated lumber, may be used to support the flooring 900. The beams 800A-D may be placed at regular intervals, such as 2 feet on center, to provide adequate support for the flooring 900, which may be, for example, wood or composite decking.

In many cases, the decking 900 or beams 800 are configured to be replaced every five to seven years. The support assemblies described herein allow for ready replacement or adjustment of one or more components when the decking is replaced. In many embodiments, only the rings (e.g., bottom 400A and top 400B rings) of the support assembly are replaced when the decking in replaced every five to seven years.

Figure 19:
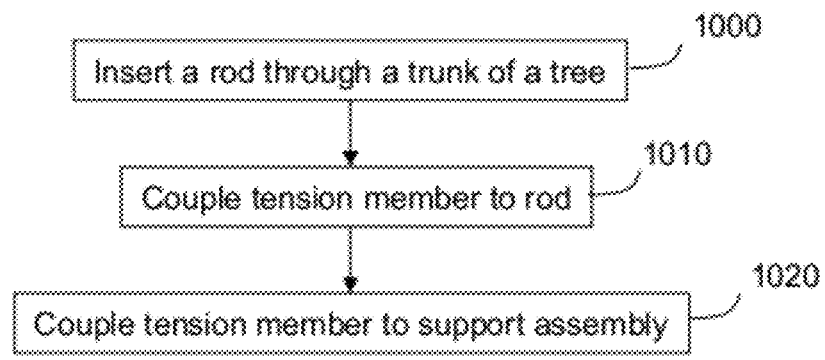
FIGS. 19-20 are flow diagrams of overviews of methods described herein.
Figure 20:
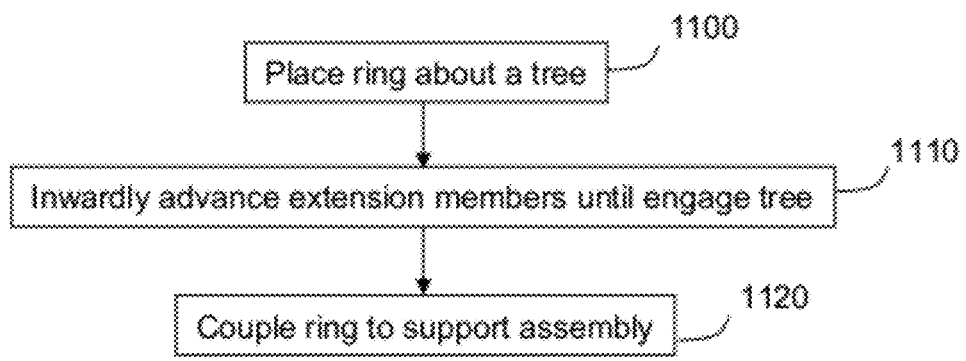

The support assemblies described herein may be installed in any suitable manner and via any suitable process. Overviews of examples of some methods that may be employed to install components are shown in FIGS. 19-20. The method depicted in FIG. 19 includes inserting a rod through a trunk of a tree (1000). The rod is longer that the diameter of the tree and is inserted such that both ends of the rod extend out of the tree. A tension member, such as a turnbuckle, is coupled to an end of the rod (1010) and is coupled to a support assembly (1020), such as a bottom rail of a support assembly. Typically, a second tension member is coupled to the other end of the rod and is coupled to a second support assembly on the other side of the tree.

The method depicted in FIG. 20 includes placing a ring about a tree (1100). The ring may be a multipart ring. The ring has, or is associated with, extension members that are inwardly advanceable relative to the ring. The extension members are inwardly advanced until they engage the tree (1110) to maintain the ring radially relative to the tree. In addition, the ring is coupled to a support assembly (1120), such as a top or bottom rail of a support assembly, to retain the support assembly radially relative to the tree.

It will be understood that the steps in the depicted methods may be performed in any suitable order and need not follow the order depicted in FIGS. 19-20. It will also be understood that the methods depicted in FIGS. 19-20 may be practiced together or independently.

The tree-based platform supports described herein may be used in their entireties to provide easy to install, structurally sound, or readily adjustable tree-based platforms. Of course, various components described herein may be used in conjunction with known tree-based platform supports to enhance the installation, structural integrity, or ease of adjustment of such known supports. For example, the ring structures described herein may be used in conjunction with prior support assemblies; the rod inserted through the tree and associated tension members may be used to suspend previously known support assemblies; and the like.

Thus, embodiments of the TREE PLATFORM AND SUPPORT are disclosed. One skilled in the art will appreciate that the present invention can be practiced with embodiments other than those disclosed. The disclosed embodiments are presented for purposes of illustration and not limitation.

What is claimed is:

1. A tree-based platform support assembly, comprising:
a rod configured to be inserted through the trunk of a tree;
a first ring having an inner diameter and defining an opening configured to receive a portion of a tree;
a first plurality of extending members inwardly advanceable relative to the first ring, each extending member configured to engage the tree in the opening of the first ring when sufficiently advanced;
a second ring having an inner diameter and defining an opening configured to receive a portion of the tree;
a second plurality of extending members inwardly advanceable relative to the second ring, each extending member configured to engage the tree in the opening of the second ring when sufficiently advanced;
first and second supports, each comprising a bottom rail, a top rail, and side rails, wherein the bottom rails of the first and second supports are configured to be coupled to the first ring, and wherein the top rails of the first and second support are configured to be coupled to the second ring; and
a first tension element configured to couple to the rod and the bottom rail of the first support; and
a second tension element configured to couple to the rod and the bottom rail of the second support.

2. The platform support assembly of claim 1, wherein the first and second tension members are turnbuckles.

3. The platform support assembly of claim 1, wherein the first and second supports are isosceles trapezoid-shaped.

* * * * *